United States Patent [19]

Takada

[11] 4,299,408
[45] Nov. 10, 1981

[54] INPUT MOTION COUPLING TO A MOTION AMPLIFIER FOR USE IN PASSIVE SEAT BELT RESTRAINT SYSTEMS

[76] Inventor: Juichiro Takada, 3-12-1 Shinmachi Setagayaku, Tokyo, Japan

[21] Appl. No.: 45,172

[22] Filed: Jun. 4, 1979

[30] Foreign Application Priority Data

Nov. 27, 1978 [JP] Japan ................................. 53-145272

[51] Int. Cl.³ .......................................... B60R 21/02
[52] U.S. Cl. ..................................... 280/804; 297/469
[58] Field of Search ....................... 280/803, 804, 802; 297/469

[56] References Cited

U.S. PATENT DOCUMENTS

| | | | |
|---|---|---|---|
| 3,583,726 | 6/1971 | Lindblad | 280/804 |
| 3,754,776 | 8/1973 | Cataldo | 280/803 |
| 3,806,155 | 4/1974 | Hafele | 280/803 |
| 3,995,884 | 12/1976 | Bauer | 280/804 |

FOREIGN PATENT DOCUMENTS

| | | | |
|---|---|---|---|
| 2245802 | 4/1973 | Fed. Rep. of Germany | 280/803 |
| 2161384 | 6/1973 | Fed. Rep. of Germany | 280/804 |

*Primary Examiner*—John P. Silverstrim

*Attorney, Agent, or Firm*—Brumbaugh, Graves, Donohue & Raymond

[57] ABSTRACT

A passive occupant restraint belt system for a vehicle which includes a restraining belt and apparatus for moving the belt from an occupant restraint to an occupant releasing position in response to opening of a door of a vehicle. A belt transfer device engages the seat or shoulder belt for moving the belt between the restraining to releasing positions and is actuated by a motion transmission mechanism which transmits and amplifies opening motions of the door to the belt transfer device. The transmission includes a motion amplifier mounted on either the vehicle body or door, and a linkage having one end attached to the other of the body and door and its other end coupled to an input component of the motion amplifier. The linkage is coupled to the other of the vehicle body or door during normal door operation when the door is between closed and partway open to transmit door opening movement to the amplifier but released when the door is between partway open and fully open. The linkage also releases in emergency situations, when the amplifier or belt transfer mechanism is damaged and thereby inoperative, so that the door may open notwithstanding the inability of the motion amplifier to operate.

3 Claims, 7 Drawing Figures

INPUT MOTION COUPLING TO A MOTION AMPLIFIER FOR USE IN PASSIVE SEAT BELT RESTRAINT SYSTEMS

BACKGROUND OF THE INVENTION

This invention relates to a passive occupant restraint belt system in which the belt is automatically, easily and effectively transferred between occupant-restraining and occupant-releasing configurations in response to opening and closing movements of a vehicle door.

In recent years there have been many proposals for passive occupant restraint systems for vehicles. The most common type of restraint systems are those based on restraint belts, and most of the proposed belt systems include a belt transfer mechanism which is driven by an electric motor, a mechanical lever, or a gear transmission. In the case of mechanical drives, a motion transmitter coupled between the belt transfer device and the vehicle body or door transmits and amplifies the door opening and closing movements to the belt transfer device. One such mechanical device, which is capable of moving the restraining belt between occupant-restraining and occupant-releasing positions in response to a partial opening of the door, is shown and described in commonly-owned U.S. application Ser. No. 950,020, filed Oct. 10, 1978.

In the case of an accident, however, where the vehicle body or door is deformed, the motion transmitter and belt transfer devices may be damaged and possibly rendered inoperative. It is desirable, therefore, that the motion transmitter and amplifier, which are normally coupled between the vehicle body and door, release should the belt transfer mechanism or motion transmission device bind up.

SUMMARY OF THE INVENTION

There is provided, in accordance with the present invention, a passive vehicle occupant restraint belt system which includes apparatus for moving a restraining belt from an occupant-restraining to an occupant-releasing position in response to opening of the vehicle door. The apparatus moves the belt by transmitting and amplifying the opening and closing motions of the door to a belt transfer device, such as a wire, a racked wire, or a tape connected to a transfer guide which engages the belt. In the case of an accident or emergency, however, where the mechanism has been damaged and is thus inoperative, the coupling transmitting the door movements to the belt transfer device releases, and thus the door opens free of the belt system.

In particular, the mechanism comprises a belt transfer device engaging the belt and arranged to move the belt from the restraining to the releasing position, and a motion transmitting device coupled to the belt transfer device for transmitting and amplifying the opening motion of the door to the belt transfer device. The transmitting device includes a motion amplifier mounted on either the vehicle body or the door, and a releasable linkage having one end attached to the door when the amplifier is mounted on the body, or to the body when the amplifier is mounted on the door. The other end of the linkage is coupled to an input component of the motion amplifier.

In preferred form, the linkage includes a first link coupled at one end to an input component of the motion amplifier and a second link coupled at one end to the vehicle body or door. The other ends of the two links are connected to each other by a resilient, releasable detent which holds the links together during normal door opening movement to transmit such movement through the linkage to the motion amplifier. However, where the amplifier or belt transfer mechanism is damaged and inoperable, the detent releases and the two links are free to move apart as the door is opened.

In one embodiment of the invention, one link is a strip of spring steel bent in half on itself to form a pair of closely spaced legs like a very large hair pin. Each leg is bent out away from the other at a corresponding location partway along the length to produce a bulge. The other link has a pin which is received in the hole formed by the two bulges. The legs are sufficiently stiff, and may also be held together by guide pins on the other link which straddle the legs of the resilient link, to connect the two links so that they normally act as a single link to transmit motion to the input of the motion amplifier. If the motion amplifier or the belt transfer devices jam for one reason or another, the legs of the resilient, hairpin-like link are spread apart by the pressure of the pin and allow the pin to escape from the hole in the enlargement and the two links to slide apart.

If desired, the detent can release intentionally in normal operation when the door is partway open in a belt system having a motion amplifier and transfer device which moves the belt completely to the releasing configuration when the door is moved only partway open. After release of the detent, no motion is transmitted by the linkage to the motion amplifier when the door moves between partway and fully open. If the amplifier or transfer mechanism jams, the detent will release and allow the door to be opened without transmitting motion.

In another embodiment of the invention, the linkage comprises a first link having a rack gear coupled to an input component of the motion amplifier and a second link fixedly connected to the first link and having an enlarged portion along its length. The second link is received in a coupler which comprises a pair of opposed spring loaded catches which engage the enlarged portion and prevent retraction of the second link from the coupler under normal door opening force, but which releases the linkage in emergency situations.

In a third embodiment of the invention, a linkage connected to the door transmits door opening movement to a block and tackle arrangement which drives a wire attached to the belt transfer guide. A spring loaded detent is provided in the linkage connection to the door, such that under normal door opening and closing conditions, door opening movement is transmitting to the block and tackle arrangement to move the belt transfer mechanism, but in emergency situations, the detent releases and the door is free to move without actuating the block and tackle mechanism and thereby the belt transfer guide.

The latter two linkages may also move the belt between the restraining and releasing positions in response to partial door movements, that is, when the door is moved between closed and partway open. When the door is between closed and partway open, the linkage is coupled through the detent to transmit door opening movement to the amplifier. When the door has reached partway open and the belt has moved completely to the releasing position, further door opening movement causes the detent to release and thereby allows the door to open fully without further actuating the amplifier and thereby belt transfer mechanism.

For a better understanding of the invention, reference is made to the following detailed description of the preferred embodiments, taken in conjunction with the drawings accompanying the application.

DETAILED DESCRIPTION OF THE PREFERRED EMBODIMENTS

Figure 1:
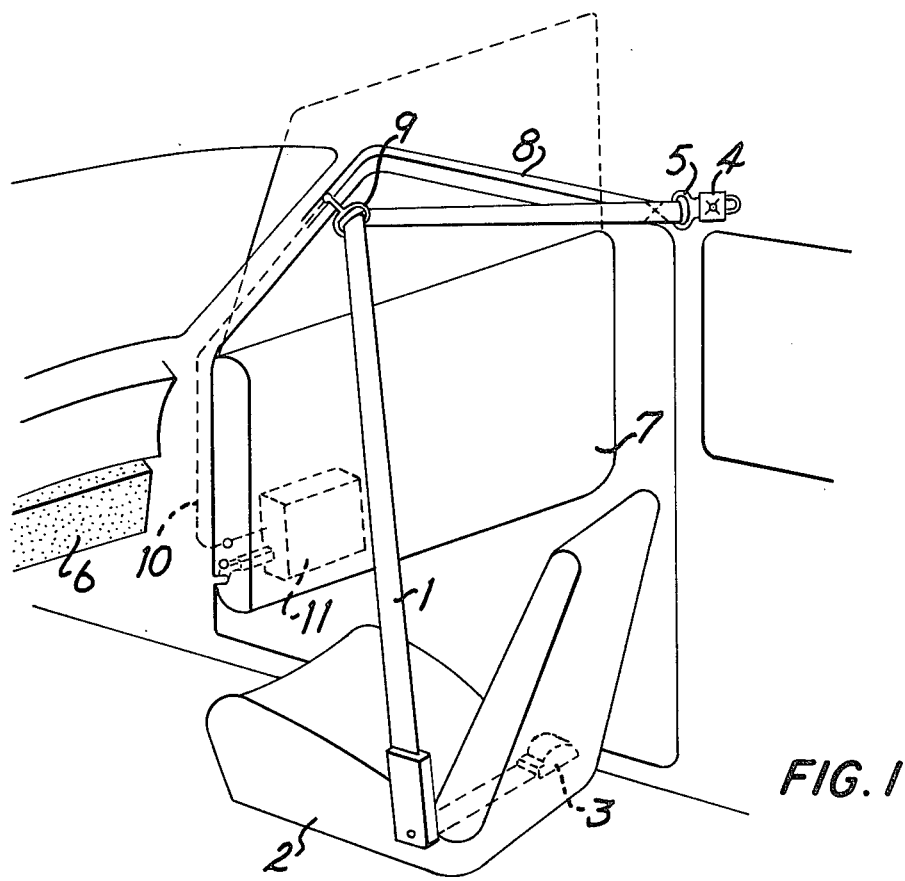
FIG. 1 is a pictorial view in schematic form of an embodiment of a complete belt restraint system shown in the occupant-releasing configuration.

Referring to FIG. 1, a passive occupant belt restraint system comprises a shoulder belt 1, which is attached at the outboard end by a tongue 5 to an emergency release buckle 4 attached to the roof near the upper rear corner of the vehicle door 7. The belt 1 extends from the buckle to and through a belt transfer guide ring 9 and then across the seat 2 through a guide and to an emergency locking retractor 3 located under the seat 2. A shock absorbing knee bolster 6 is positioned in front of the driver or passenger compartment for protecting the lower part of the occupant's body.

The belt transfer guide ring 9 is received in a track 8 in the roof above the door and moves back and forth between the occupant-releasing position (FIG. 1) and an occupant-restraining position, in which the ring 9 is moved back to a restraint position near the buckle 4. A drive wire 10, which may be a wire, a racked wire or a tape, engages the ring 9 to move it back and forth along the track. A transmitting mechanism 11, consisting of a motion amplifier 31 and a linkage, drives the wire 10 to move the belt transfer ring 9.

The linkage is connected between the vehicle body 13 and the amplifier 31 to transmit door opening and closing movements. As the door 7 is opened or closed, the linkage moves relative to the amplifier 31, as described below, and a rack gear on one of the links 15 drives an input pinion 18 of the motion amplifier 31. A first large gear 19, concentric to and rotatable with the input pinion 18, drives a second pinion 20, which in turn drives the output 21 of the amplifier 31. The output 21 engages and drives the wire 10 to move the belt transfer ring 9 between the restraining and releasing positions in accordance with door opening and closing movements.

Figure 2:
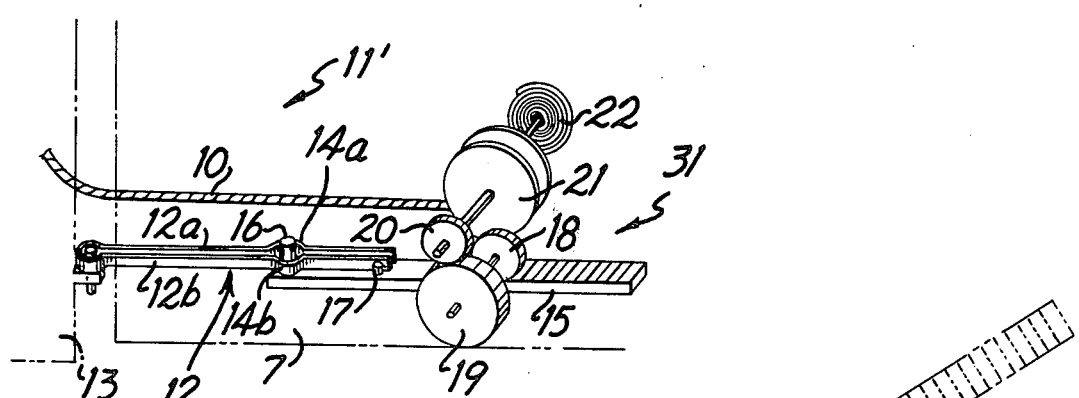
FIG. 2 is a pictorial, schematic illustration of a transmitter mechanism for use with various belt restraint systems such as that shown in FIG. 1.
Figure 3:
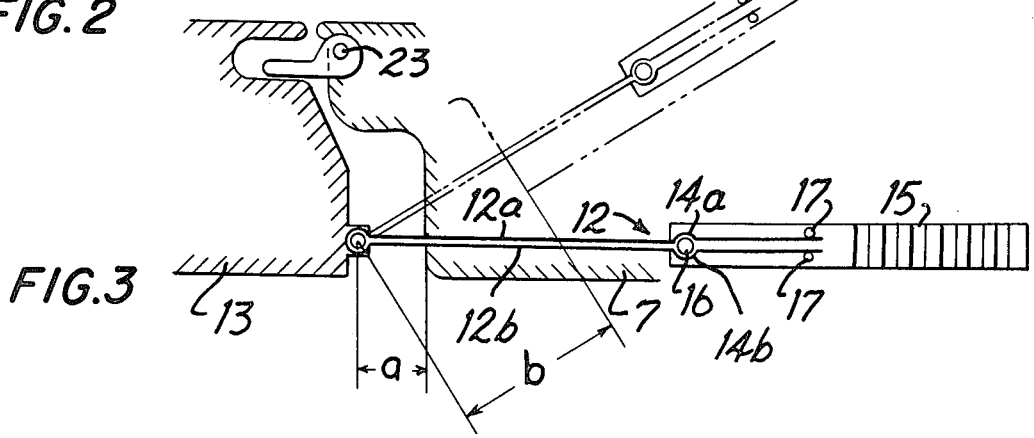
FIG. 3 is a top view in schematic form of the linkage shown in FIG. 2 with the door in the closed and partway open positions.
Figure 4:
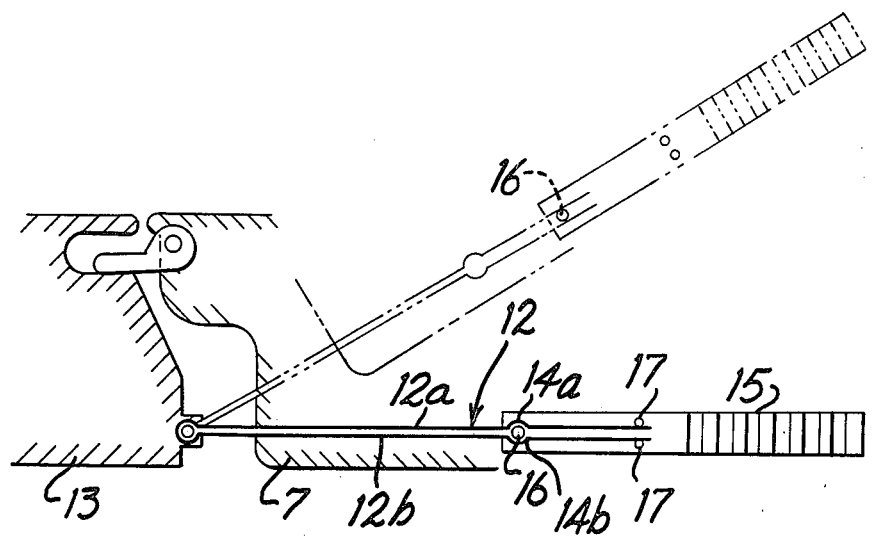
FIG. 4 is a top view in schematic form of the linkage shown in FIG. 2 with the door in its closed position and having been opened with the belt transfer mechanism or amplifier inoperative.

In one embodiment of the linkage, as shown in FIGS. 2 to 4, a first link 15 is coupled by a rack gear at one end to the input pinion 18 of the motion amplifier. A second link 12 is attached at one end to the vehicle body 13, and the adjacent end portions of the first and second links 12 and 15 are coupled by a detent. The link 12 is a strip of spring steel bent in half back on itself at the pivot end where it is attached to the vehicle, thus to form a pair of closely spaced legs 12a and 12b. It is like a large hair pin. Each leg is bent out at a corresponding location to produce a bulge 14a, 14b partway along the length. The hole defined in the link by the bulges receives a pin 16. The first link also has a pair of guide pins 17 for maintaining the first and second links aligned and holding the legs together to increase the spring force capturing the pin 16.

Normally, the two links remain coupled so that door movement between open and closed is transmitted through the linkage to the input pinion 18 of the amplifier 31. The closed door 7 (solid lines FIG. 3) is spaced a distance "a" from the point where the second link 12 is attached to the vehicle body 13. When the door is partway open (phantom lines FIG. 3), and the door has pivoted about 23, this distance has increased to "b". Thus, since the pinion 18 is fixed relative to the door, the rack gear has been pulled away from the input pinion 18 and motion amplifier 31 by a distance equal to b minus a to drive the input pinion 18 and thereby the motion amplifier, the racked wire 10, and the belt transfer ring 9 from the restraining toward the releasing position. Further door opening movement to the fully open position moves to belt transfer ring completely to the releasing position.

Referring to FIG. 4, if when the door is closed (solid lines) the belt transfer mechanism or amplifier were damaged and were to bind, the door would nevertheless open. With the input pinion 18 unable to rotate, attempted door opening would apply a force across the linkage until the spring force in the legs of the link 12 is overcome by the pressure of the pin 16 against the bulges 14a and 14b, thus forcing the legs to spread apart to release the detent and the first link 15 and second link 12 to slide apart as the door is opening (phantom lines FIG. 4).

Figure 5:
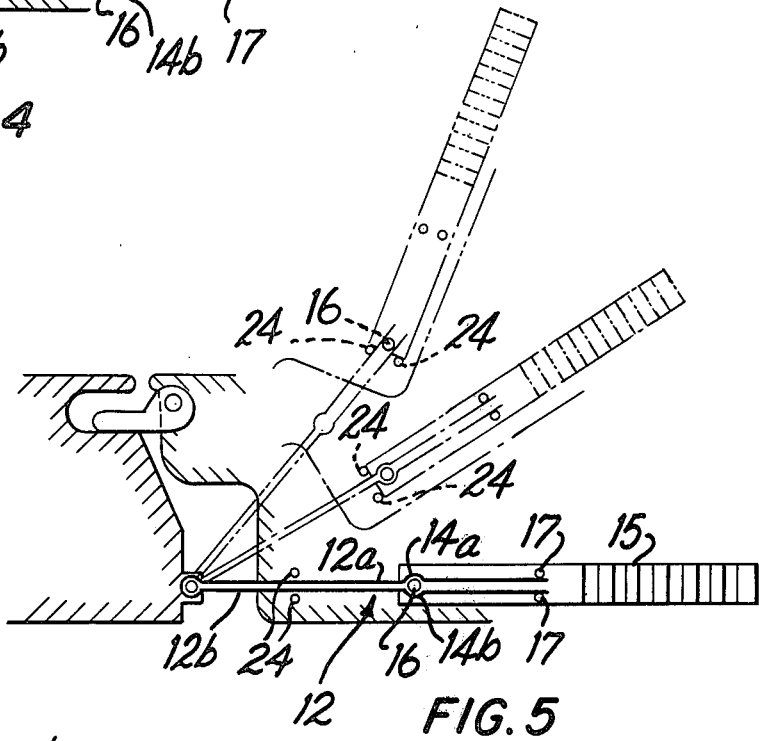
FIG. 5 is a top view in schematic form of a modified form of the embodiment of FIGS. 1 to 4 shown at various stages of door movement.

In a slightly modified form of the linkage (FIG. 5), the amplifier moves the belt transfer ring 9 completely between the occupant-releasing and occupant-restraining positions when the door is moved between closed and partway open. The detent release feature of the linkage is used to permit the door to move between partway open and fully open without imparting further movement to the amplifier. In this embodiment, a pair of linkage stops 24 are attached on the door 7 and arranged so that the first link 15 engages the stops 24 when the door has reached a partway open position and the belt transfer ring 9 has moved completely to the occupant-releasing position. At that time, further movement of the first link 15 and thereby rack gear is not desired, and accordingly is prevented by the stops 24.

Thus, when the door is moved from closed (solid lines FIG. 5) to partway open (dash dotted lines FIG. 5), the linkage remains coupled by the detent 14, 16 to transmit the opening motion of the door to the amplifier to move the belt transfer ring 9. When the door has reached partway open, the first link 15 engages the stops 24, and further movement of the first link 15 and rack gear are prevented. Upon door opening movement between partway open to fully open (dash-double dotted line configuration FIG. 5), excessive door opening force is applied across the mechanism since further movement of the rack gear 15 is prevented. The detent 14, 16, thus releases, and the first link 15 and second link 12 slide apart, with the pin 16 sliding between the legs 12a and 12b. When the door is again closed, the pin 16 engages the hole defined by the bulges 14a and 14b in the link 12 (dash dotted line FIG. 5), whereupon with further door closing movement the linkage is recoupled to transmit door closing movement to the amplifier to move the belt transfer ring 9 to the restraining position.

Figure 6:
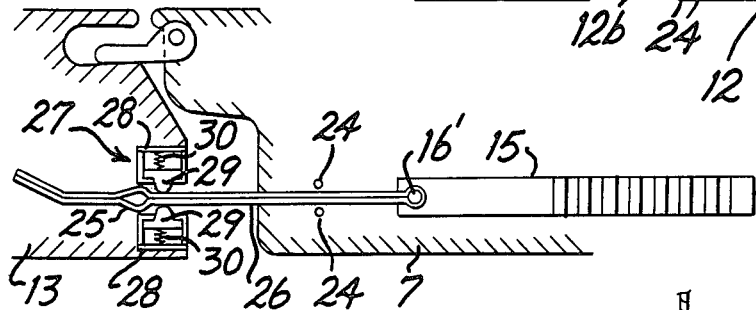
FIG. 6 is a top view in schematic form of another embodiment of a linkage in accordance with the present invention.

Another embodiment of a linkage mechanism is shown in FIG. 6. The linkage includes a first link 15 with a rack gear for engaging the input pinion 18 of the motion amplifier 31, and is rigidly coupled at 16' to a second link 26 having an enlarged portion 25. The enlarged portion 25 of the second link 26 is captured in a coupler 27 having a pair of opposed locking members 29, spring loaded, at 30, towards each other, and contained in guides 28. Operation of this device is much the same as that shown in FIG. 5. During normal operation, door opening and closing movements between the closed and partway open position are transmitted to the motion amplifier to move the belt transfer guide ring 9 between the restraining and releasing positions. Upon reaching a partway open position, the first link 15 engages the stops 24, and further door opening movement releases the enlarged portion 25 from the spring loaded locking members 29. Also, in an emergency situation, if the door is damaged and the input pinion 18 and rack gear are unable to move, the coupler 27 releases the second link 26 to permit the door to open.

Figure 7:
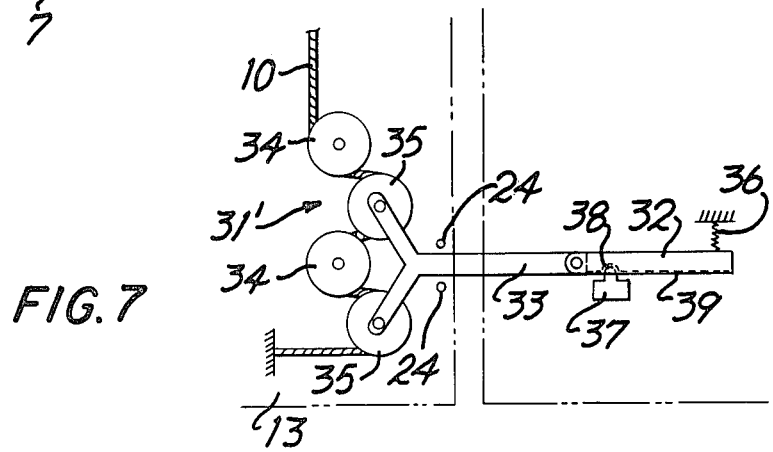
FIG. 7 is a side view in schematic form of a block and tackle type amplifier and a linkage for transmitting and amplifying door movements.

Another embodiment of a linkage mechanism is illustrated in FIG. 7. The wire 10, rather than being coupled to the output of a gear type motion amplifier, is driven by a block and tackle arrangement 31' which amplifies door movements transmitted through the linkage 32, 33. Two prongs of a Y-shape link 33 carry a pair of pulleys 35, which are movable toward and away from a pair of stationary pulleys 34 on the vehicle body 13. When the linkage 32, 33 is connected to the door, door opening movement separates the movable pulleys 35 away from the stationary pulleys 34, and draws the wire 10 into the block and tackle mechanism 31 to move the belt transfer ring 9 to the releasing position.

The free end of the Y-shape member 33 is connected to a second link 32. A detent in the form of a projection 37 attached to the door and a cooperating receiving notch 38 in the second link 32 couples the linkage to the door. The second link 32 is biased toward the projection 37 by a spring 36. A pair of stops 24 are also attached to the vehicle body 13.

As the door is moved from closed to partway open, the opening movement is transmitted to the block and tackle 31'. When the door reaches a partway open position, the Y-shape link 33, which has been displaced toward the right, engages the stops 24. With further door opening movement, since the Y-shape member is held, the door opening force causes the detent 37,38 to release, and the projection 37 and notch 38 to separate. Thereafter, the projection 37 slides along a groove 39 in the second link 32 to permit the door to be fully open, while at the same time imparting no further input into the block and tackle mechanism.

The detent also releases should the block and tackle arrangement or the belt transfer mechanism become damaged and rendered inoperable. Door opening force, since it would be unable to move the block and tackle mechanism, would be transmitted across the linkage and cause the detent 37, 38 to release. Door opening movement would thereafter be permitted, and the projection 37 would slide along in the groove 39 in the second link 32.

The invention has been described above with reference to certain preferred embodiments thereof. Variations and modifications of these embodiments will be apparent to those skilled in the art, without departing from the inventive concepts disclosed herein. For example, several forms of detent for coupling the linkage between the amplifier and the vehicle door or body have been shown and described, but any suitable detent may be utilized. All such variations and modifications are intended to be within the scope of the present invention, as defined in the following claims.

I claim:

1. In a passive occupant restraint belt system which includes a restraining belt, and apparatus for moving the belt between occupant-restraining and occupant-releasing positions in response to opening and closing movements of a door of the vehicle comprising belt transfer means engaging the belt for moving the belt between the restraining and releasing positions and motion transmission means coupled to the belt transfer means for transmitting and amplifying opening motions of the door to the transfer means, the transmission means including a motion amplifier mounted on either of the vehicle body and door, the improvement comprising means for coupling an input component of the amplifier and the other of the body and door during normal door opening and closing movements, the means for coupling including a linkage that comprises a first link having one end coupled to an input component of the motion amplifier, a second link having a pair of closely spaced-apart resilient leg portions, joined at only one end, means at said one end for coupling said second link to the other of the body and door, and means for releasably coupling the other end of said first link to the other end of said second link to permit axial movement therebetween in emergency situations when the motion transmission means or belt transfer means is rendered inoperative, the means for releasing including a bulge in a corresponding location in each leg portion defining with the bulge in the other leg portion a hole, and a pin on the first link releasably received in said hole, which pulls axially of the linkage out of the hole by forcing the leg portions apart upon application of a high pulling force on the linkage.

2. Apparatus according to claim 1 and further comprising stop means for engaging and stopping the first link when the door in moving from closed reaches a partway open position, thereby increasing the force in the linkage and releasing the pin from the hole.

3. Apparatus according to claim 1 and further comprising guide elements on the first link engaging the leg portions of the first link to guide them and hold them together.

* * * * *